United States Patent [19]

Werner et al.

[11] Patent Number: 4,992,105
[45] Date of Patent: Feb. 12, 1991

[54] METHOD AND APPARATUS FOR THE HYDROLYTIC SEPARATION OF CELLULOSE

[75] Inventors: Johannes Werner; Klaus-Jürgen Hinger, both of Stuttgart, Fed. Rep. of Germany

[73] Assignee: Werner & Pfleiderer, GmbH, Fed. Rep. of Germany

[21] Appl. No.: 236,453

[22] Filed: Aug. 25, 1988

[30] Foreign Application Priority Data

Sep. 3, 1987 [DE] Fed. Rep. of Germany ....... 3729428

[51] Int. Cl.$^5$ .......................... B01J 3/00; C13K 1/02
[52] U.S. Cl. ......................................... 127/1; 127/37; 162/14; 422/188; 422/189; 422/209; 422/233
[58] Field of Search .............. 127/1; 162/14; 422/188, 422/189, 209, 233, 232

[56] References Cited

U.S. PATENT DOCUMENTS

| | | | |
|---|---|---|---|
| 4,427,453 | 1/1984 | Reitter | 127/1 |
| 4,468,256 | 8/1984 | Hinger | 422/233 |
| 4,589,924 | 5/1986 | Erckel et al. | 162/14 |
| 4,645,541 | 2/1987 | DeLong | 127/1 |
| 4,706,903 | 11/1987 | Brink et al. | 127/1 |
| 4,708,746 | 11/1987 | Hinger | 162/14 |

FOREIGN PATENT DOCUMENTS

| | | |
|---|---|---|
| 0081678 | 3/1986 | European Pat. Off. |
| 577850 | 5/1933 | Fed. Rep. of Germany |
| 1567350 | 4/1974 | Fed. Rep. of Germany |
| 1567335 | 3/1979 | Fed. Rep. of Germany |

OTHER PUBLICATIONS

"Comparison of the Economics of Acid and Enzymatic Hydrolysis of Newsprint", Biotechnology and Bioengineering, vol. XX, pp. 503-525 (1978).

Primary Examiner—Chung K. Pak
Attorney, Agent, or Firm—Laff, Whitesel, Conte & Saret

[57] ABSTRACT

A plurality of reactors, which can all be interconnected selectively by way of pipes, are used for the hydrolytic separation of a cellulose-containing substrate so that a stepwise pressure reduction in one reactor is made possible and thus a stepwise pressure build-up in all the other reactors. The steam entering and leaving the reactors is used to produce a fluidized bed of the substrate. A high output with a low specific expenditure of energy is achieved by these measures.

11 Claims, 6 Drawing Sheets

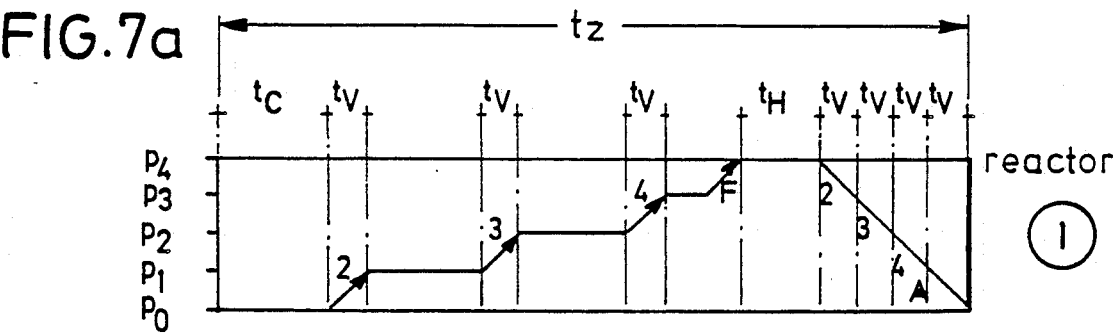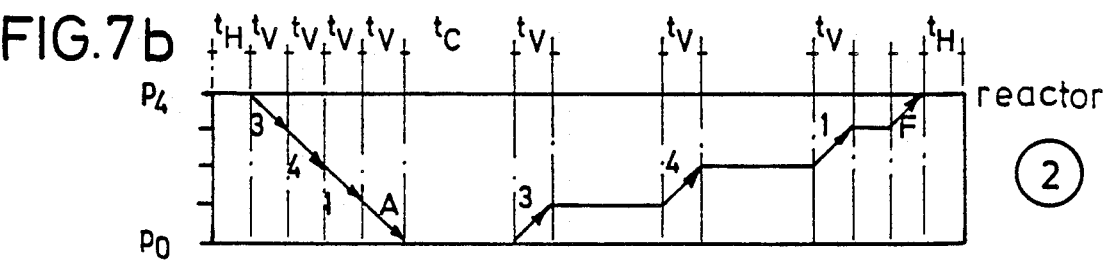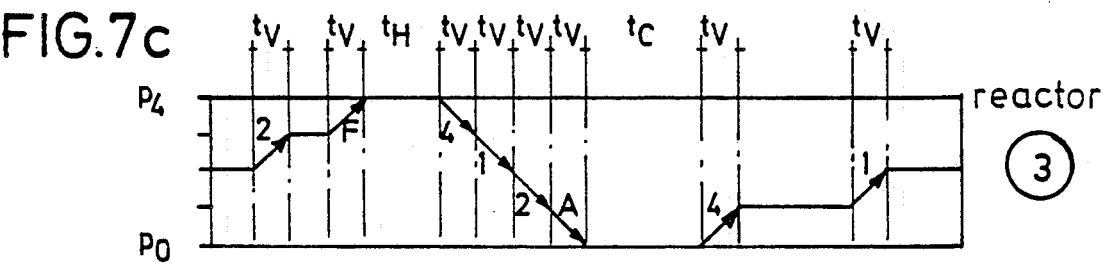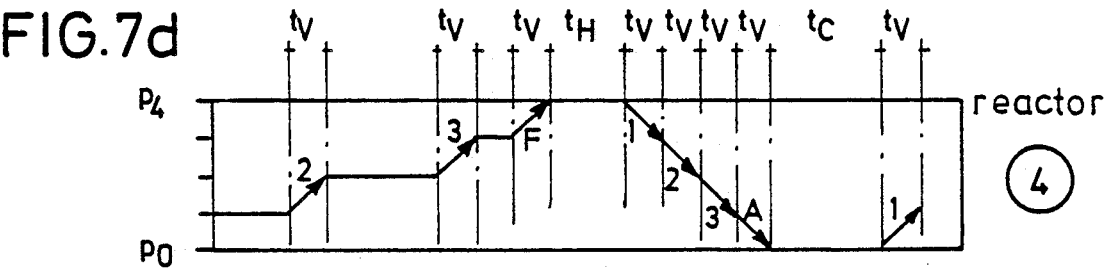

METHOD AND APPARATUS FOR THE HYDROLYTIC SEPARATION OF CELLULOSE

FIELD OF THE INVENTION

The invention relates to a method for the hydrolytic separation of a cellulose-containing substrate comprising an acid treatment of the substrate and a subsequent water vapour treatment of the substrate in a reactor, water vapour impinging in a plurality of discrete pressure build-up stages at successive time intervals and each having increasing pressure and temperature values and then a pressure drop taking place in the reactor in immediately successive pressure drop stages corresponding to the pressure build-up stages during water vapour treatment in a hydrolysis cycle, and the steam of a pressure drop stage being used for the pressure build-up of the next lowest pressure build-up stage of another temporally successive hydrolysis cycle. Furthermore the invention relates to an apparatus for carrying out this method, the apparatus comprising a reactor which can be connected to pipes for feeding and education of steam of different pressure stages, a live steam pipe being provided for the pressure stage having the highest pressure.

BACKGROUND OF THE INVENTION

In the course of general development in power economy, alcohol has gained increasing importance as a motor fuel or motor fuel additive. Alcohol for such purposes can be made from cellulose or cellulose-containing biomass in two stages by firstly hydrolyzing cellulose to form sugar and then fermenting it to form ethanol. While the fermentation of sugar to form ethanol is technically well controlled, the hydrolysis of cellulose is still the critical process step which determines the overall economy of the method.

There are shortcomings in the known methods of acid-catalysed hydrolysis of cellulose, which are based essentially on the Bergius and Scholler processes (DE-C-577 850), particularly in that the energy content of the alcohol produced is frequently lower than the energy which is required to operate the entire plant and which is required to operate the entire plant and which must be provided particularly in the form of heating steam and electric current.

Percolator-type fixed bed reactors for semicontinuous hydrolysis are known, for example, from DE-A-15 67 350 and DE-A-15 16 335, batch diluted sulphuric acid running over a fixed bed of wood chips, and cellulose being converted into glucose with a yield of approximately 50% at a hydrolysis temperature of 120° to 145° C. and a sojourn time of 15 to 60 minutes. In addition to the relatively adverse glucose yield, a high specific expenditure of energy is required in this case.

An essential theoritical attempt towards improvements results from the publication of Hans E. Grethlein in the journal "Biotechnology and Bioengineering", Vol. II (1978), Pages 503 to 525 "Comparison of the Economics of Acid and Enzymatic Hydrolysis of News-print". In this publication it was stipulated that a high output of glucose relative to the ALPHA cellulose used is achieved if the hydrolysis temperatures are increased by 250° C. up to 300° C. at pressures of 40 to 90 bars, and if dilute sulphuric acid is used with a concentration of up to 2.0% and the hydrolysis time is extremely short.

Starting from this publication, U.S. Pat. No. 4,708,746 disclosed a method of the type as defined in which high outputs of fermentable sugar relative to the cellulose-containing substrate used should be achieved with a low expenditure of energy. With this method the steam which is extracted from the reactor during the removal of pressure was stored in accumulator with different pressure levels and used again for a partial pressure build-up in a subsequent hydrolysis cycle. Although the method of energy recuperation is initially advantageous, the expenditure or external energy and the output were still unsatifactory.

SUMMARY OF THE INVENTION

The main object of the invention is therefore to create a method of the type as defined and an apparatus of the type as defined in which a high output is achieved in each case with a low expenditure of energy.

In the method of the type as defined, this problem is solved by the features according to which during the pressure drop the steam is fed from the reactor in pressure drop stages having decreasing pressure values directly to a plurality of time staggered hydrolysis cycles each taking place in a separate reactor. The achievement created by the director transfer of steam during pressure removal from on reactor at the end of a hydrolysis cycle in several stages to a plurality of other reactors is that no energy losses are caused by temporary storage in accumulators. Because the steam is in each case transferred from one process to a following process, sulphuric acid which contributes towards improving the hydrolysis result is also transferred with the steam. A particularly intensive contact between the water vapour and defibrated cellulose substrate is achieved by the measures according to which the substrate is transferred with the steam into a fluidized bed at least during pressure build-up, resulting in a particularly intensive control of the hydrolysis process because the caking of the substrate, which is detrimental to high-pressure separation, does not occur. The hydrolytic separation of celluloses takes place therefore in a high-pressure fluidized bed.

The inventive apparatus is characterised in that there are provided a plurality of reactors which are directly connected to one another by pipes and can be connected to one another in such a manner that each reactor can be connected successively to all the other reactors, the removal of pressure taking place successively in the first mentioned reactor in such a manner that the next lowest pressure stage is build up in all the other successive reactors. The reduction in the lowest pressure stage in the first mentioned reactor is exhaust steam. The highest pressure stage in each case must be built up by live steam.

A high intensification of the hydrolysis process in a high-pressure fluidized bed is achieved by the measures according to which installations for producing a fluidized bed of the substrate are provided in each reactor. To enable the extremely short cycle times to be achieved by the provision of a plurality of reactors which can be connected to one another, hydrolysis tanks are provided for feeding the substrate into each reactor and at least one loading and unloading device are provided for handling these tanks. Measures are provided to make possible optimum loading and unloading times for the individual hydrolysis tanks and reactors.

When there are provided four reactors forming two pairs of two reactors, each pair of which is arranged in juxtaposition to one another and the two pairs are arranged in mirror symmetry with one another and the pipes connect front sides of the reactors facing one another, these measures optimize firstly control of the process and secondly a constructionally simple form for the apparatus. In particular, the individual pipes between the reactors are very short and approximately equal in length so that storage effects and in particular different storage effects do not occur.

Further advantages and features of the invention will become apparent from the following description of an exemplary embodiment taken in conjunction with the drawings.

BRIEF DESCRIPTION OF THE DRAWINGS

FIG. 7a to 7d show four diagrams relating to the pressure build-up or reduction in the individual reactors and their connection with one another.

DESCRIPTION OF THE PREFERRED EMBODIMENT

Figure 1:
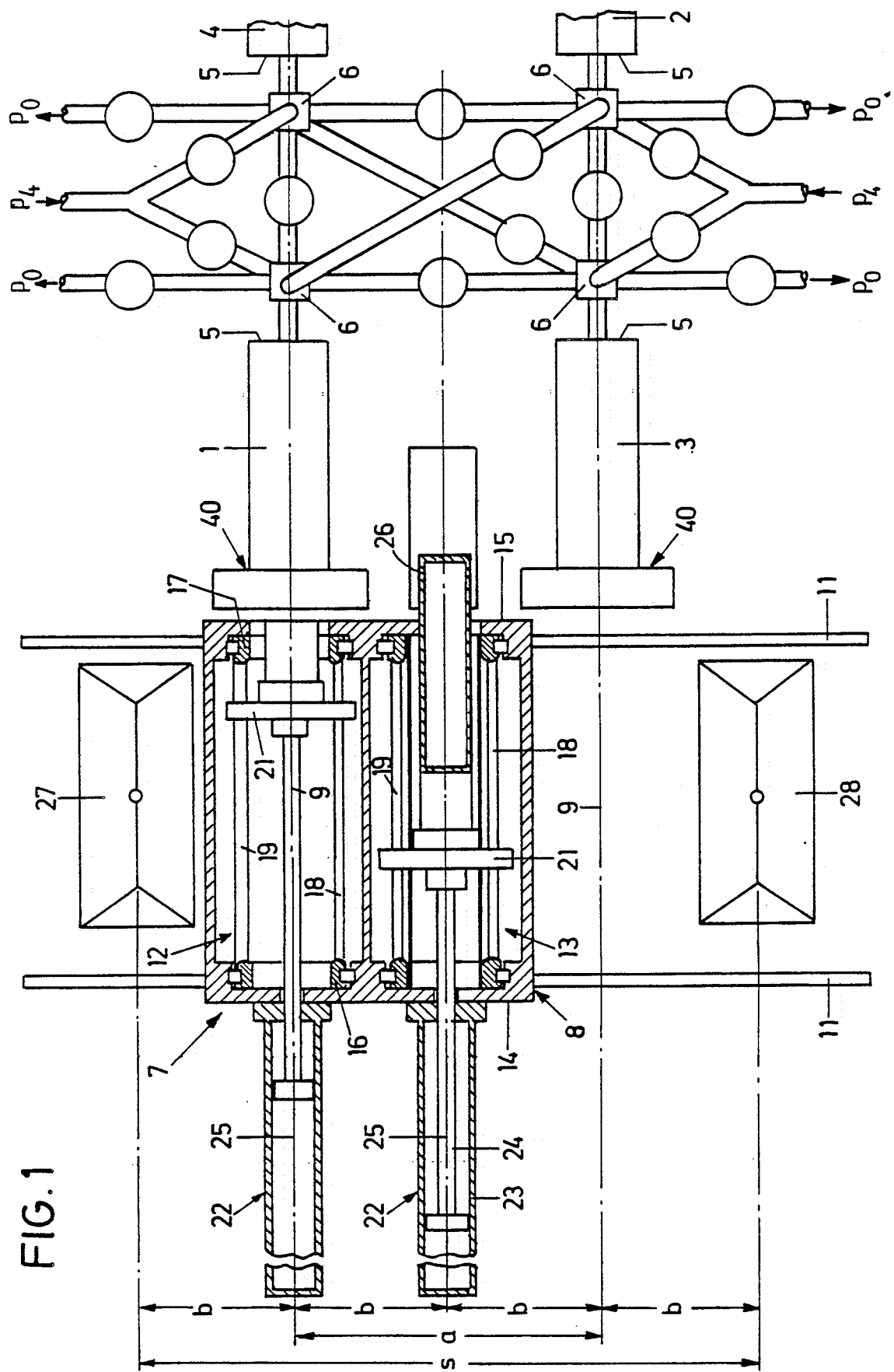
FIG. 1 shows an apparatus to the invention, in plan view.

The plant shown in the drawing has four reactors 1, 2, 3, 4 which are juxtaposed in pairs and arranged opposite one another, as shown in FIG. 1. Only one pair of reactors 1,3 is shown together with the associated installations, whilst only the ends of the oppositely lying pair of reactors 2,4 are indicated. The latter pair are identically designed and arranged in mirror symmetry with the pair of reactors 1,3. Distributor units 6 for piping, which will be described in even more detail further on, are arranged in the area of the associated ends 5 of the reactors 1 to 4. On the sides opposite the ends 5 a charger 7 is provided for each pair of juxtaposed reactors 1, 3 or 2,4.

Each charger 7 has a carriage 8 which can be moved in the plane covered by the central longitudinal axes 9 of the reactors 1 to 4, i.e, usually horizontally. All the axes 9 run in a horizontal direction. The axes 9 of two adjacent reactors 1,3, or 2,4 are parallel to one another. The carriage 8 can be moved on two roller conveyors 11, which are supported relative to the ground 10, at right angles to the axes 9 of the reactors 1,3. For this purpose the carriage has rollers 8a, at least one roller 8a of which can be driven by means of a motor 8b.

Each carriage 8 has two loading and unloading devices 12, 13 which are identically designed. For each loading and unloading device 12, 13 turntables 16, 17 lying opposite one another are arranged in two opposite side walls 14, 15 of the carriages 8, which walls are parallel to the roller conveyors 11, the turntables being connected to one another by two guide bars 18, 19, these two guide bars 18, 19 lying in a common plane which is parallel to or coincides with the plane covered by the two axes 9 of a reactor group 1, 3 or 2, 4. The turntable 16 which is remote from the reactors 1,3 can be rotated through 180° by means of a turntable drive unit 20. On the guide bars 18, 19 holding and coupling devices 21 can be displaced over approximately the entire length of the guide bars 18, 19 by means of each lifting drive 22 attached to the side wall 14 of the carriage 8. Each lifting drive 22 consists in the usual manner of a hydraulically operatable piston-cylinder drive, the cylinder 23 of which is attached to the side wall 14 remote from the reactor group 1,3, whilst its piston rod 24 is attached to the holding and coupling device 21. The central longitudinal axis 25 of the lifting drive 22 and holding and coupling device 21 is in alignment with each axis 9.

A hydrolysis tank 26, by means of which a substrate to be hydrolysed can be introduced into the reactors 1,2 or 2,4 can be fitted on each holding and coupling device 21. Each reactor group 1,3 or 2,4 is associated with a total of three hydrolysis tanks 26 of this type. The distance a between the axes 9 of the two reactors 1, 3 of a reactor group is equal to twice the distance b between the two axes 25 of the lifting drives 22 with the holding and coupling device 21. Collecting vessels 27, 28 for a hydrolyzate are each arranged at the distance b laterally of the reactors 1,3 the collecting vessel 27 being associated with reactor 1 and the collecting vessel 28 with the reactor 3.

Figure 2:
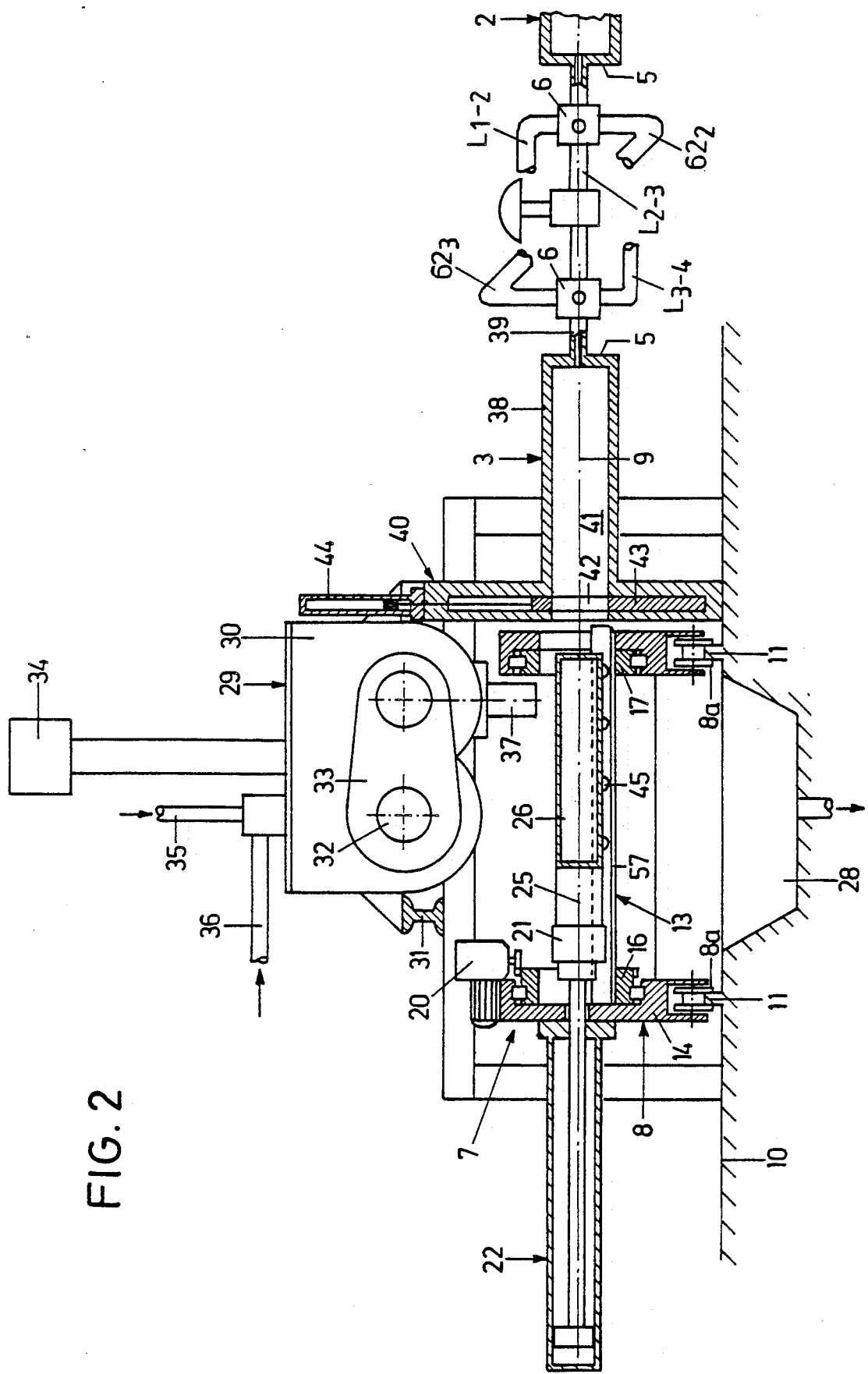
FIG. 2 is a side view of the apparatus in partial section.
Figure 3:
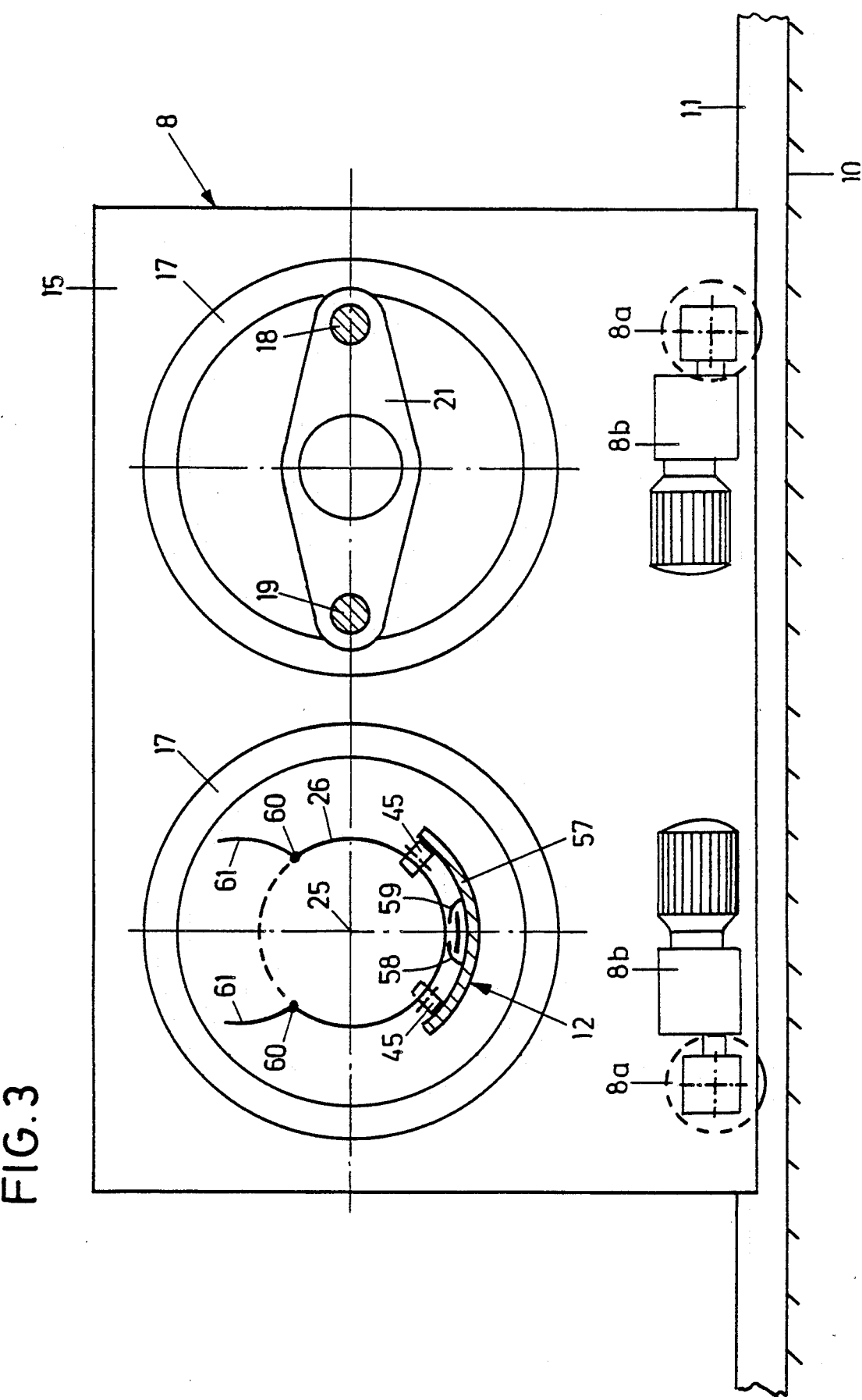
FIG. 3 is a vertical cross-section through the charger.

The carriage 8 can be moved over a distance s to which s=4×b applies in accordance with the earlier explanations. When the carriage 8 is in one extreme position the loading and unloading device 12 is situated above the collecting vessel 27. When in the other extreme position, the loading and unloading device 13 is situated above the collecting vessel 28. In the two intermediate positions each loading and unloading device 12 or 13 is situated below a filling apparatus 29. In the case of the loading and unloading device 13 this is shown in FIG. 2.

Such a filling apparatus 29 has defibrator 30 which is arranged in a frame 31 above the carriage 8. It is driven by a drive motor 32 via a gear 33. Cellulose-containing material, for example waste paper, flax or the like, is fed downwards to the defibrator 30 by means of a conveying device 34. In addition, exhaust steam is fed to the defibrator via an exhaust steam pipe 35 and sulphuric acid ($H_2SO_4$) is fed through an acid pipe 36. On the underside the defibrator 30 is provided with a filling chamber 37 through which the hydrolysis tanks 26 are charged with substrate. The filling of a hydrolysis tank of this type takes place with the loading and unloading device 13 in the position shown in FIG. 1, the hydrolysis tank 26 which is attached to the holding and coupling device 21 extending initially through the turntable 17 into and as far as the area between the two reactors 1,3. During filling, the hydrolysis tank 26 is moved in the direction of the side wall 14 through appropriate actuation of the lifting drive 22, as a result of which it is charged uniformly. At the end of the filling operation the hydrolysis tank 26 is completely received again inside the carriage 8 so that the latter can be moved transversely.

Figure 4:
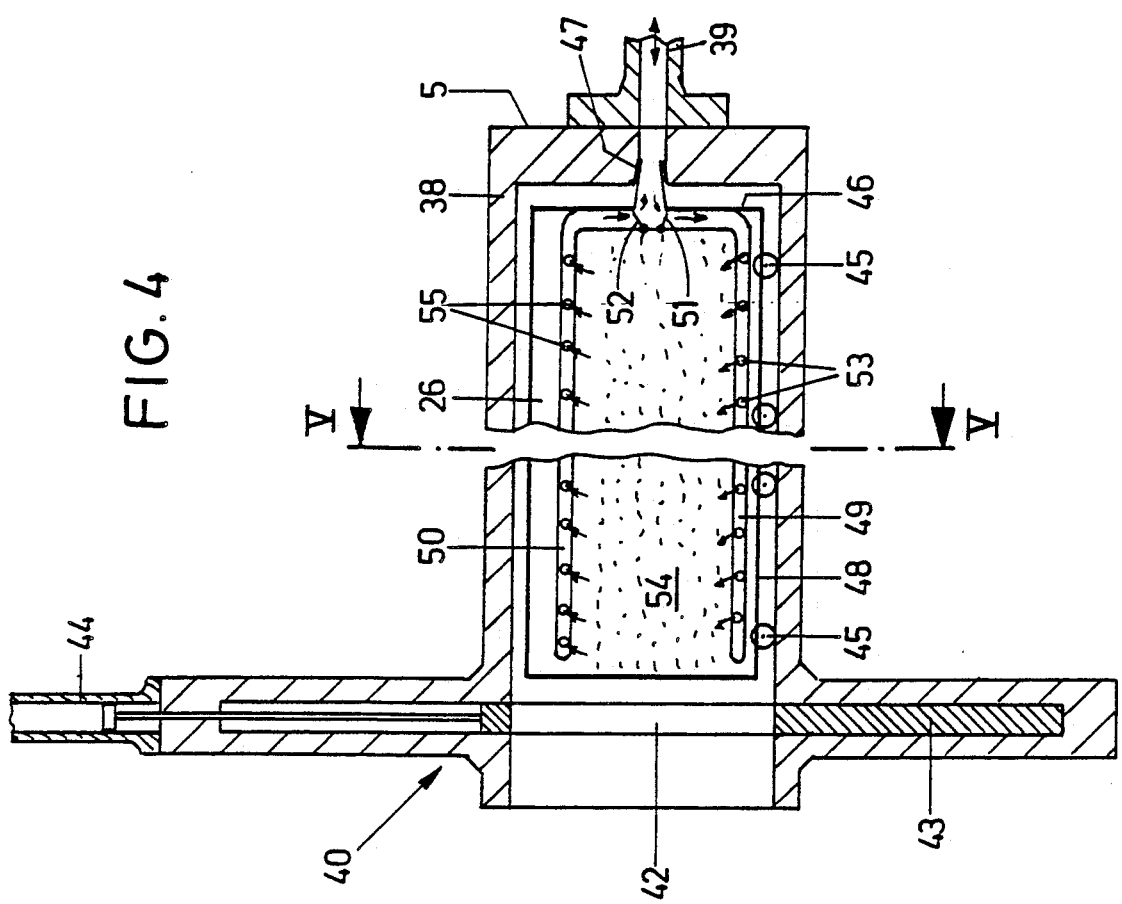
FIG. 4 is a vertical longitudinal section through a reactor.
Figure 5:
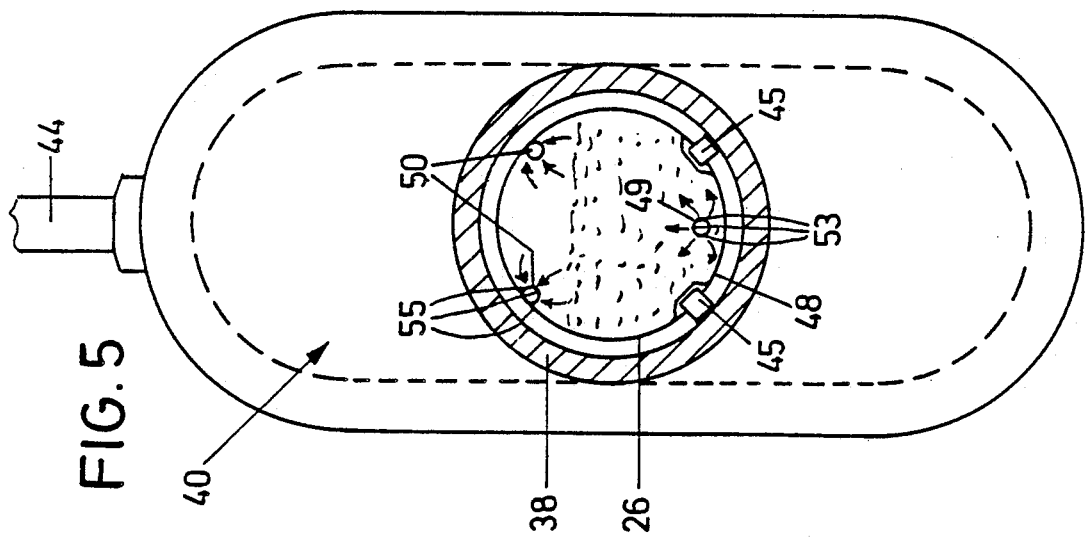
FIG. 5 is a vertical section through the reactor along the line V—V in FIG. 4.
Figure 6:
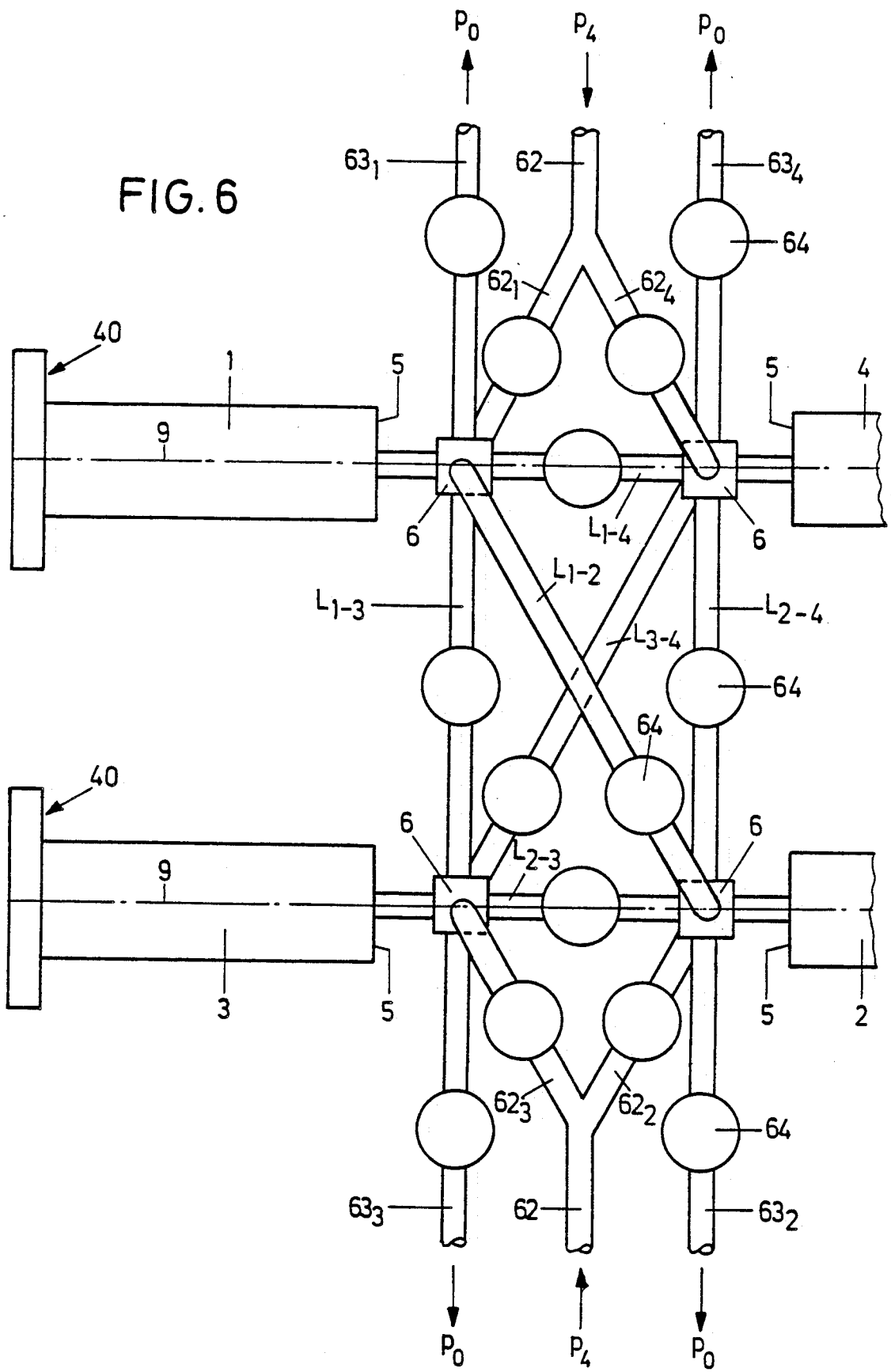
FIG. 6 shows the pipe connections between four reactors.

As is evident particularly from FIGS. 4 and 5, each reactor 1, 2, 3, 4 has an essentially cylindrical pressure tank 38, into the closed end 5 of which leads a pressure line 39 which is connected to the associated distributor block 6. On the side which is remote from the end 5 and facing the carriage 8, there is provided a slider seal 40 for sealing the pressure chamber 41 situated in the pressure tank 38. This seal has essentially a sealing plate 43 which closes or opens the associated opening 42 of the pressure chamber 41 and which can be displayed by means of a linear drive 44.

A hydrolysis tank 26 has in its underside area rollers 45 by means of which it can be moved in the pressure tank 38. In addition, it has on its end wall 46 facing the end 5 of the pressure tank 38 a pipe-in coupling 47 which, when the hydrolysis tank 26 is moved into the pressure chamber 41 of the corresponding reactor, is connected to the pressure line 39 which opens at this point. This coupling 47 is followed by a vaporization pipe 49 which is guided through the area of the bottom 48 of the essentially cylindrical hydrolysis tank 26.

The coupler 47 is followed by pressure relief pipes 50 which are arranged in the upper area of the hydrolysis tank and likewise extend essentially over the length of this tank. Between the two pipes 49, 50 on the one hand, and the couple, on the other, there are provided two check valves 51, 52 of which the check valve 51 connects the pressure line 39 to the vaporization pipe 49 if the pressure in the pressure line 39 is greater than that in the pipes 49, 50. The check valve 52 is closed in this case. Steam is therefore forced out of the pressure line 39 into the vaporization pipe 49. If, on the other hand, the pressure in the hydrolysis tank 26 is higher than in the pressure line 39, the check valve 51 closes while the check valve 52 opens and connects the pressure relief pipes 50 to the pressure line 39 so that steam can escape from the hydrolysis tank through the pressure line 39. In the vaporization pipe 49 arranged in the area of the bottom 48, there are formed a large number of steam exhaust ports 53 which are distributed over the pipe length and through which steam escapes and flows upwards through the substrate 54 in the hydrolysis tank 26, resulting in a fluidized bed effect. In the upper pressure relief pipes 50 there are arranged steam inlet ports 55 which are likewise distributed over the pipe length and through which steam can enter these pipes 50.

The hydrolysis tanks 26 are in the form of cylindrical cartridges which are not pressure sealed and are made for example of sheet metal. With the aid of the rollers 45 arranged in pairs on their undersides, the tanks can be moved in the cylindrical pressure tank 38 of each reactor 1 to 4 and on guide and holding track 57 of each loading and unloading device 12 or 13. This guiding and holding track 57 consists essentially of a metal sheet in the shape of a cylindrical ring segment which is attached to the turntables 16 and 17 of each loading and unloading device 12, 13. Attached to each hydrolysis tank 26, between the rollers 45, is a sliding coupling 58 in the form of an inverted T piece which can be slid into a coupling rail which serves as a cooperating coupling 59 and is turn attached to the guide and holding track. If the hydrolysis tank is drawn out of a reactor 1 to 4 on to the guide and holding track 57 of the corresponding loading and unloading device 12 or 13, the sliding coupling 58 engages in the rail-like cooperating coupling 59 so that the hydrolysis tank 26 is retained on the guide and holding track 57 perpendicular to the axis 25. On the side lying opposite the rollers 45, the hydrolysis tank 26 has a two-part cover 61 which extends over the entire tank length, is shaped like a cylinder jacke segment and connected by hinges 60. This cover is opened for filling. To empty a hydrolysis tank 26 via collecting vessel 27 or 28, the corresponding loading and unloading device is rotated through 180° by driving the turntable drive unit 20 accordingly so that the hydrolysis tank 26 is suspended on the corresponding guide and holding track 57. The cover 61 opens under its gravitational force and the contents of the hydrolysis tank fall out.

By way of the four distributor blocks 6 of each reactor 1, 2, 3, 4, these four reactors are connected to one another by pipes L, the numbers of the two reactors—connected by a hyphen—being added to each L as an index, and the two reactors being connected to one another via each pipe L. The reactors 1 and 3 are accordingly connected to one another via the pipe $L_{1-3}$. In addition, each distributor block 6 and thus each reactor 1, 2, 3, 4, is connected to a live steam pipe 62, the number of each reactor to which the corresponding live steam pipe 62 leads being added to the reference numeral 62 as an index. The live steam pipe $62_4$ therefore leads to the reactor 4.

Finally, an exhaust steam pipe 63 leads off each distributor block 6, the number of the associated reactor 1 to 4 being in turn added to the reference numeral 63 as an index. The exhaust steam pipe $63_2$ therefore leads from the reactor 2.

A valve 64, which is for example in the form of a solenoid valve, is connected into each pipe L, 62 and 63 so that each individual pipe can be opened or closed.

The method of hydrolyzing cellulose-containing material, for example waste paper, is described below.

In the defibrator 30 of the filling apparatus 29 the cellulose-containing material is defibrated and in this case sprayed simultaneously with exhaust steam at 100° C. and normal pressure, which exhaust steam is fed through the exhaust steam pipe 35. This pipe is connected to the exhaust steam pipes 63. At the same time the material fibres, for example therefore waste paper fibres, are mixed on the one hand with the 2 to 4% sulphuric acid solution which is fed via the acid pipe 36 and sprayed on to the fibres. In addition, the fibres are heated up to 100° C. and moistened by the steam. Whenever steam is referred to, water vapour is meant. As will be evident from the description to follow, the exhaust steam contains sulphuric acid which condenses on the material which is to be impregnated with water and sulphuric acid and is referred to below as the substrate. This substrate is tipped out of the filling apparatus 29 via the chamber 37 into a hydrolysis tank 26 which—as already described above—is drawn under the chamber 37 during the filling operation.

FIG. 7 shows four diagrams a, b, c, d one above another which reproduce the pressure variation in the reactors 1, 2, 3, 4 that is during the same time. Because the processes each take place at the saturated steam temperature, the pressures are associated with present temperatures. The individual pressure and temperature values can be obtained from the following Table. Each pair of adjacent pressures define a pressure stage, i.e., the pressure $P_0$ and $P_1$ define the lowest pressure stage. The same applies to the temperatures

TABLE 1

| Pressure | Pressure bar | Temperature °C. | Remarks |
|---|---|---|---|
| $P_0$ | 1.0 | 100 | Exhaust steam |
| $P_1$ | 8.3 | 172 | |
| $P_2$ | 24 | 220 | |
| $P_3$ | 47 | 258 | |
| $P_4$ | 66 | 280 | Live Steam |

According to diagram a in FIG. 7 a hydrolysis tank 26 containing hydrolyzed substrate is removed from the reactor 1 during loading and unloading time $t_C$ and a new hydrolysis tank 26 containing fresh and already impregnated substrate is introduced. Following this, steam, which is reduced from pressure $P_2$ the pressure $P_1$ in the reactor 2, is transferred from the reactor 2 during a valve switching time $t_V$ by opening the valve 64 in the pipe $L_{1-2}$, which in turn results in a pressure build-up from $P_0$ to $P_1$ in the reactor 1. Therefore, the same pressure $P_1$ is then present in both reactors 1 and 2. The valve switching time $t_V$ is therefore necessary for the interconnection, pressure equalisation and separation of each pair of reactors.

Following a time interval due to the general control of the process, a pressure build-up from pressure $P_1$ to pressure $P_2$ takes place during a further valve switching time $t_V$ by opening the valve 64 in the pipe $L_{1-3}$ in the reactor 1, and at the same time the pressure drops from $P_3$ to pressure $P_2$ in the reactor 3.

After a further time interval caused by the process, the reactor 1 is connected to the reactor 4 by opening the valve 64 in the pipe $L_{1-4}$ as a result of which a pressure drop from the maximum pressure $P_4$ to the pressure $P_3$ occurs in the latter whereas the pressure is hereby increased from $P_2$ to $P_3$ in the reactor 1.

After a short time interval the live steam piper $62_1$ is switched to the reactor 1 by opening the valve 64 in this pipe whereby the pressure is increased from $P_3$ to $P_4$ in this reactor. Hydrolysis of the substrate takes place during the subsequent hydrolysis time $t_H$. After hydrolysis is completed, the pressure in the reactor 1 is reduced in four partial steps, i.e, during four valve switching times $t_V$ in each case. In diagrams a to d in the case of each valve switching time $t_V$, during which therefore either the pressure is increased or reduced, the corresponding reference numeral 1 to 4 of each reactor 1 to 4 indicates the reactor to which the reactor to which each diagram applies is connected. From this it follows that during pressure reduction in the reactor 1 the latter is firstly connected to the reactor 2 during pressure reduction from pressure $P_4$ to pressure $P_3$, then to the reactor 3 during pressure drop from pressure $P_3$ to pressure $P_2$ and then to the reactor 4 during pressure reduction from pressure $P_2$ to pressure $P_1$. In each case the pressure reduction from pressure $P_1$ to pressure $P_0$ takes place in the filling apparatus.

It follows from the preceding text that in the case of the individual reactors the cycle time $t_Z$, which are the same for all four reactors 1 to 4, are each time staggered by 0.25 $t_Z$ relative to one another.

The calculation of cycle times $t_Z$ for different hydrolysis times $t_H$ and different loading/unloading time $t_C$ is shown in the following Table 2.

In the event of four pressure stages and four reactors, the formula for calculating the cycle time is:

$$t_Z = t_H + 3 \cdot t_C + 9 \cdot t_V$$

TABLE 2

| Loading/unloading time $t_c$ | Valve switching time $t_v$ | Hydrolysis time $t_H$ | | | | |
|---|---|---|---|---|---|---|
| | | 3 | 5 | 7 | 10 | 15 |
| | | Cycle time $t_z$ | | | | |
| 5 | 3 | 45 | 47 | 49 | 52 | 57 |
|   | 5 | 63 | 65 | 67 | 70 | 75 |
| 10 | 3 | 60 | 62 | 64 | 67 | 72 |
|    | 5 | 78 | 80 | 82 | 85 | 90 |
| 15 | 3 | 75 | 77 | 79 | 82 | 87 |
|    | 5 | 93 | 95 | 97 | 100 | 105 |
| 20 | 3 | 90 | 92 | 94 | 97 | 102 |

TABLE 2-continued

| Loading/unloading time $t_c$ | Valve switching time $t_v$ | Hydrolysis time $t_H$ | | | | |
|---|---|---|---|---|---|---|
| | | 3 | 5 | 7 | 10 | 15 |
| | | Cycle time $t_z$ | | | | |
|   | 5 | 108 | 110 | 112 | 115 | 120 |

Hydrolysis takes place essentially at temperatures in the region of approximately 280° C. The type of hydrolysis concerned is a so-called short time hydrolysis. However, during the individual pressure build-up stages a type of hydrolysis is already taking place which proceeds considerably more slowly than at the maximum temperature of approximately 280° C. and thus does not have a considerable scope.

The hydrolysis tank 26 is operated in each reactor 1 to 4 as a high-pressure fluidized bed in which the defibrated and impregnated substrate is caused to whirl upwards both by the incoming steam and by the exhausted steam. The admitted steam enters the pressure build-up phase (coupling phase)—as already described—through the lower vaporization pipe 49 and emerges from its steam exhaust ports 53. The exhausted steam escapes through the upper pressure relief pipers 50 during the pressure relief phase. Because of this hydrolysis in the high-pressure fluidized bed the contact between the sulphuric acid acting as a catalyst and the individual fibres is extremely intensive. Hydrolysis is further intensified because during pressure drop in a reactor sulphuric acid is conveyed away with the steam escaping therefrom and is fed to the other reactors.

The loading and unloading of a hydrolysis tank 26 is incorporated in the cycle according to FIG. 7. As shown in the diagram a in FIG. 7, the reactor 1 is unpressurised at the end of a cycle time $t_Z$. Then the sealing plate 43 is lifted by actuating the linear drive 44 and thus the pressure chamber 41 of the reactor 1 is opened. By means of the lifting drive 22 the holding and coupling device 21, which—as shown above in FIG. 1—is already in the waiting position in front of the reactor 1, is pushed into the pressure chamber 41 and coupled with the hydrolysis tank 26 situated therein. Then the hydrolysis tank 26 is removed, its sliding coupling 58 engaging the cooperating coupling 59 of the guide and holding track 57 of the loading and unloading device 12. The carriage 8 is moved into one extreme position—situated in the upper part of FIG. 1. The loading and unloading device 12 is rotated by actuating the turntable drive 20 so that the hydrolyzed substrate falls into the collecting vessel 27. At the same time as this described process, a hydrolysis tank 26, which is situated in the loading and unloading device 13 and has already been filled below the filling apparatus 29, has been moved in front of the reactor 1 and pushed into the latter during movement of the carriage 8. Then the opening 42 of the pressure chamber 41 is closed again by lowering the sealing plate 43, thus terminating the loading and unloading time $t_C$.

Following this, the carriage is moved by two path sections b so that the hydrolysis tank, which has just been emptied and is situated in the loading and unloading device 12, comes under the filling apparatus 29 where it is filled after having been previously rotated back again into its normal position. No hydrolysis tank is situated in the other loading and unloading device 13 so that the hydrolysis tank situated in the reactor 3 can be removed next after the hydrolysis process in this reactor is terminated.

What is claimed is:

1. Apparatus for carrying out a method for the hydrolytic separation of a cellulose-containing substrate comprising an acid treatment and a subsequent water vapor treatment of the substrate, water vapor impinging in a plurality of discrete pressure build-up stages at successive time intervals and each having increasing pressure and temperature values and then a pressure drop in immediately successive pressure drop stages corresponding to the pressure build-up stages during water vapor treatment in a hydrolysis cycle, and the steam of a pressure drop stage being used for the pressure build-up of the next lowest pressure build-up stage of another temporally successive hydrolysis cycle comprising:

four reactors (1 to 4), forming two pairs of two reactors, each pair of which is arranged in juxtaposition to one another and the two pairs are arranged in mirror symmetry with one another and the number of which corresponds to the number of pressure stages;

a live steam pipe (62) connected to each reactor for feeding live steam to a reactor for producing a pressure stage of the highest pressure;

a connection pipe (L) connecting each reactor to each other for feeding steam during a pressure drop in one of said reactors from this reactor in pressure drop stages having decreasing pressure values directly to a plurality of time-staggered hydrolysis cycles each taking place in a separate one of said reactors;

an exhaust steam pipe (63) connected to each reactor for education of steam out of a reactor, where a pressure drop stage has the lowest pressure;

each of said connection pipes, live steam pipes and exhaust steam pipes is provided with a valve (64) for controlling said pressure build-up stages and said pressure drop stages;

hydrolysis tanks (26) connected to each reactor for feeding the substrate into each reactor (1 to 4); and at least one loading and unloading device (12, 13) is positioned in front of at least one reactor and said device comprises means for inserting a hydrolysis tank through an opening of the reactor into said reactor and to take said hydrolysis tank out of said reactor.

2. Apparatus according to claim 1, wherein said hydrolysis tank is a fluidized bed.

3. Apparatus according to claim 1, wherein there are provided in each hydrolysis tank (26) at least one vaporation pipe (49) and at least one pressure relief pipe (50) which are connected to the said live steam pipe, exhaust steam pipe and connection pipes (L, 62, 63), when said hydrolysis tank is inserted into a reactor.

4. Apparatus according to claim 3, wherein said at least one vaporization pipe (49) is arranged in the lower area of said hydrolysis tank and said at least one pressure relief pipe (50) in the upper area of said hydrolysis tank (26).

5. Apparatus according to claim 1, wherein the number of said at least one loading and unloading device (12, 13) corresponds to the number of said four reactors (1 to 4).

6. Apparatus according to claim 5, wherein each loading and unloading device (12, 13) is movable to a position in front of a reactor (1 to 4), to a position at a filling apparatus (29) and to a position for emptying the hydrolysis tank (26) respectively, wherein said filling apparatus is arranged for filling said substrate into said hydrolysis tank.

7. Apparatus according to claim 6, wherein each loading and unloading device (12, 13) is movable to a position in front of two adjacent reactors (1, 3 or 2, 4).

8. Apparatus according to claim 7, wherein a common filling apparatus is provided between two adjacent reactors.

9. Apparatus according to claim 11, wherein the pipes (L, 62, 63) connect front sides (5) of reactors (1 to 4) facing one another.

10. Apparatus according to claim 11, wherein each loading and unloading device (12) is provided with means for rotating a hydrolysis tank into a position for emptying said hydrolysis tank.

11. Apparatus according to claim 7, wherein two loading and unloading devices are arranged on a common carriage.

* * * * *